(12) United States Patent
Pett et al.

(10) Patent No.: US 6,240,178 B1
(45) Date of Patent: May 29, 2001

(54) BRIDGED TAP TERMINATOR

(75) Inventors: Todd A. Pett, Longmont; Qi Wang, Boulder; James W. Nevelle, Highlands Ranch, all of CO (US)

(73) Assignee: Qwest Communications International Inc., Denver, CO (US)

(*) Notice: Subject to any disclaimer, the term of this patent is extended or adjusted under 35 U.S.C. 154(b) by 0 days.

(21) Appl. No.: 09/201,043

(22) Filed: Nov. 30, 1998

(51) Int. Cl.[7] .............................. H04M 7/04; H04M 9/00
(52) U.S. Cl. ..................... 379/398; 379/394; 379/93.05; 370/494
(58) Field of Search .................... 379/394, 398, 379/399, 413, 93.08, 93.01, 90.01, 93.05, 93.11, 93.16, 93.15, 110.01, 400, 402, 405; 370/468, 524, 535, 494, 493, 497

(56) References Cited

U.S. PATENT DOCUMENTS

| | | | |
|---|---|---|---|
| 5,610,922 | * | 3/1997 | Balatoni ............................... 370/468 |
| 5,729,824 | * | 3/1998 | O'Neill et al. ....................... 455/3.1 |
| 5,757,803 | * | 5/1998 | Russell et al. ....................... 370/494 |
| 5,883,941 | * | 3/1999 | Akers ................................. 379/93.08 |
| 5,970,088 | * | 10/1999 | Chen .................................. 375/222 |
| 6,002,722 | * | 12/1999 | Wu ..................................... 375/295 |
| 6,021,167 | * | 2/2000 | Wu ..................................... 375/354 |
| 6,031,300 | * | 2/2000 | Moran ................................. 307/119 |

* cited by examiner

*Primary Examiner*—Wing F. Chan
(74) *Attorney, Agent, or Firm*—Brooks & Kushman P.C.

(57) ABSTRACT

Subscriber loops often contain bridged taps which may interfere with the transmission of DSL signals. A bridged tap terminator provides high tap impedance for POTS signals, low insertion loss for DSL signals, and impedance matching for DSL signals when connected to the bridged tap.

10 Claims, 3 Drawing Sheets

BRIDGED TAP TERMINATOR

TECHNICAL FIELD

The present invention relates to terminating bridged taps on a subscriber loop used to carry telephone service signals and digital subscriber line signals.

BACKGROUND ART

A subscriber loop connects a telephone company central office to a demarcation point on customer premises. The subscriber loop is typically a pair of wires such as a twisted pair. Traditionally, a subscriber loop is used to carry plain old telephone service (POTS) signals between central office equipment and customer equipment.

Bridged taps are sometimes introduced into the subscriber loop. Bridged taps typically are wire splices on a cable pair. Bridged taps simplify outside plant design and administration by making a wire pair physically available for termination at different customer locations. Although only one customer would use the cable pair at any time, the bridged tap provides flexibility as to which particular customer is assigned to any particular cable pair. This flexibility simplifies network design that results from frequent customer moves, requests for second lines, and new constructions. Often, a bridged tap is left unterminated once installed in the subscriber loop.

Recently, digital subscriber line (DSL) based services have been provided to customers over subscriber loops. DSL signals operate at a higher bandwidth than POTS signals, permitting voice, data, and video services. Also, DSL signals may be modulated to a frequency range outside the range covered by POTS signals.

Bridged taps in subscriber loops may severely attenuate DSL signals. This is because the unterminated bridged tap appears as a low impedance element over frequency ranges depending on the geometry of the bridged tap. If DSL signals are operating within these frequency ranges, the signals may be severely attenuated.

What is needed is proper termination of bridged taps to allow adequate transmission of both POTS and DSL signals. The termination should provide high tap impedance for POTS signals, low insertion loss for DSL signals, and impedance matching for DSL signals. Bridged tap termination should be adaptable to different tap geometries and subscriber loop variations as well as be economical to produce.

DISCLOSURE OF INVENTION

It is a primary object of the present invention to provide termination of bridged taps in communication lines.

Another object of the present invention is to improve reception on a subscriber loop.

Still another object of the present invention is to provide a bridged tap terminator with high tap impedance for POTS signals.

Yet another object of the present invention is to provide a bridged tap terminator with low insertion loss for DSL signals.

A further object of the present invention is to provide a bridged tap terminator with impedance matching for DSL signals.

A still further object of the present invention is to provide a bridged tap terminator that is economical to produce.

In carrying out the above objects and other objects and features of the present invention, a method is provided for improving reception on a subscriber loop which carries POTS signals and DSL signals. The subscriber loop contains a bridged tap which may attenuate DSL transmissions. The method includes determining coefficients for a terminating filter. The terminating filter provides high tap impedance for POTS signals, low insertion loss for DSL signals, and impedance matching for DSL signals. The terminating filter is constructed based on the determined coefficients. The bridged tap is terminated with the constructed terminating filter.

In an embodiment of the present invention, determining coefficients includes selecting high pass filter coefficients to provide high impedance for POTS signals and low insertion loss for DSL signals. Determining coefficients also includes selecting coefficients to match the bridged tap characteristic impedance. In an alternative embodiment, band pass filter coefficients are selected to provide high impedance for POTS signals and low insertion loss for DSL signals.

A bridged tap terminator for improving reception on a subscriber loop is also provided. The bridged tap terminator includes a filter connected to the bridged tap. The filter provides high impedance for POTS signals and low insertion loss for DSL signals. The bridged tap terminator also includes a matching circuit connected to the filter. The matching circuit provides impedance matching for DSL signals. In alternative embodiments, the filter may be a high pass filter or a band pass filter.

A subscriber loop system is also provided. The subscriber loop system includes a central office with POTS communication equipment and DSL communication equipment. The subscriber loop system also includes at least one customer premises with POTS communication equipment and DSL communication equipment. A subscriber loop connects POTS communication equipment in the customer premises with corresponding POTS communication equipment in the central office. The subscriber loop also connects DSL equipment in the customer premises with corresponding DSL equipment in the central office. The subscriber loop includes a bridged tap. A bridged tap terminator is connected to the bridged tap. The bridged tap terminator has a filter connected to the bridge tap for providing high impedance for POTS signals and low insertion loss for DSL signals. The bridged tap terminator also includes a matching circuit connected to the filter for providing impedance matching for DSL signals.

The above objects and other objects, features, and advantages of the present invention are readily apparent from the following detailed description of the best modes for carrying out the invention when taken in connection with accompanying drawings.

BEST MODE FOR CARRYING OUT THE INVENTION

Figure 1:
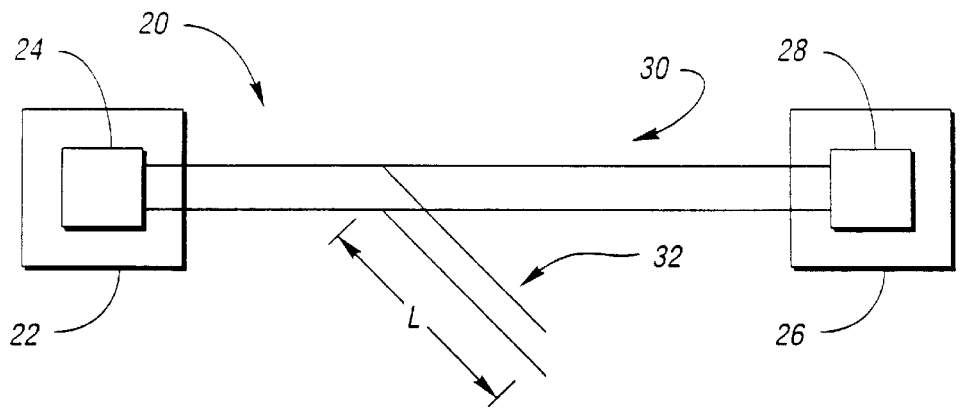
FIG. 1 is a schematic drawing of a subscriber loop having a bridged tap.

Referring now to FIG. 1, a schematic drawing of a subscriber loop having a bridged tap is shown. A subscriber loop system, shown generally by 20, includes central office 22 having communication equipment 24 capable of transmitting and receiving POTS signals and DSL signals. DSL signals may include one or more of asymmetrical DSL (ADSL), very high speed DSL (VDSL), and the like. At least one customer premises 26 includes customer premises equipment 28 operative to communicate with communication equipment 24 in central office 22. A subscriber loop, shown generally by 30, connects customer premises equipment 28 with communication equipment 24 in central office 22. Typically, subscriber loop 30 uses twisted pair cabling.

Subscriber loop 30 includes at least one bridged tap, shown generally by 32. Bridged tap 32 generally consists of a section of twisted pair transmission line which is connected in shunt with active subscriber loop 30. Bridged tap 32 simplifies outside plant design and administration by making subscriber loop 30 physically available for termination at different customer locations. Bridged tap 32 has length, L, which is typically the length of the twisted pair section spliced onto subscriber loop 30.

Figure 2:
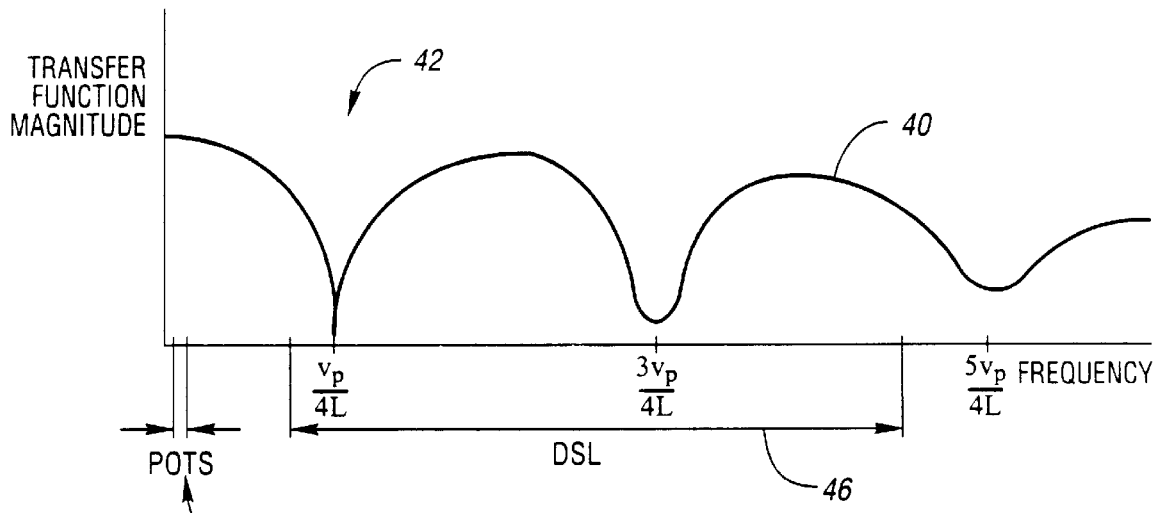
FIG. 2 is a graph of the magnitude of a transfer function for the subscriber loop of FIG. 1.

Referring now to FIG. 2, a graph of the magnitude of a transfer function for the subscriber loop of FIG. 1 is shown. Curve 40 illustrates the magnitude transfer function for subscriber loop 30 with bridged tap 32. Local minima in curve 40, one of which is shown by 42, occur at frequencies which are a function of the length L and the velocity of propagation, $v_P$. The velocity of propagation is determined by transmission line type and geometry and can vary from nearly the speed of light for parallel conductor lines with wide separation to approximately 60 percent of the speed of light for gel-filled twisted pair exchange cables. Specifically, local minima 42 occur when the bridged tap length is an odd multiple of a quarter wavelength $\lambda/4$ as in Equation 1:

$$L=(2n+1)\lambda/4 \text{ where } n=0,1,2,\ldots \quad (1)$$

The frequencies at which local minima 42 occur, $f_{minima}$, can be expressed by Equation 2:

$$f_{minima} = (2n+1)\frac{v_P}{4L} \quad (2)$$

For polyethylene insulated conductors (PIC), Equation 2 simplifies to Equation 3:

$$f_{minima} \cong (2n+1)\frac{50}{L} \quad (3)$$

where $f_{minima}$ is in MHz and the tap length, L, is in meters.

The frequency range spanned by POTS signals, shown generally by 44, is typically well below the first minimum 42. Hence, bridged tap 32 does not have a significant effect on POTS signals. The frequency range spanned by DSL signals, shown generally by 46, occurs at much higher frequencies than POTS frequency range 44. DSL signals may suffer severe attenuation if DSL frequency renge 46 includes one or more minimum 42. By properly terminating bridged tap 32, both POTS signals and DSL signals may be transmitted through subscriber loop 30 without excessive attenuation.

Figure 3:
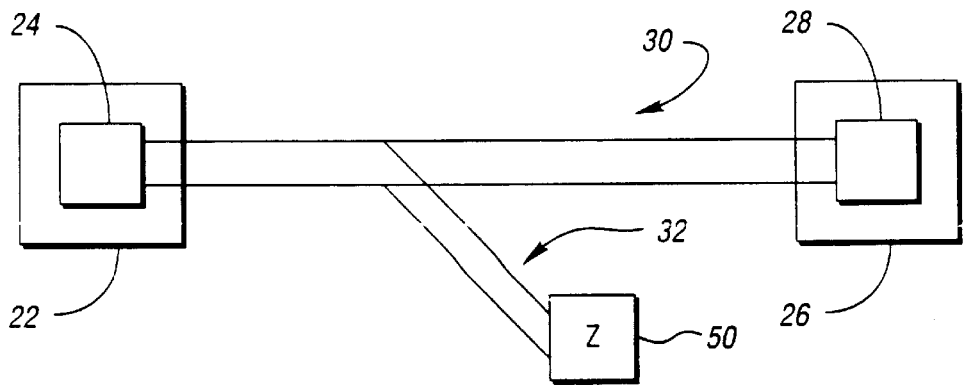
FIG. 3 is a schematic diagram of a subscriber loop having a bridged tap terminator according to the present invention.

Referring now to FIG. 3, a schematic diagram of a subscriber loop having a bridged tap terminator according to the present invention is shown. The reception on subscriber loop 30 carrying POTS signals and DSL signals can be improved by first determining coefficients for a terminating filter. The terminating filter provides high tap impedance for POTS signals, low insertion loss for DSL signals, and impedance matching for DSL signals. Determining terminating filter coefficients may include selecting a filter type, order, and configuration. The terminating filter is constructed based on the determined coefficients. Bridged tap 32 is terminated with the constructed filter. The terminating filter, shown as 50, is known as a bridged tap terminator.

Figure 4:
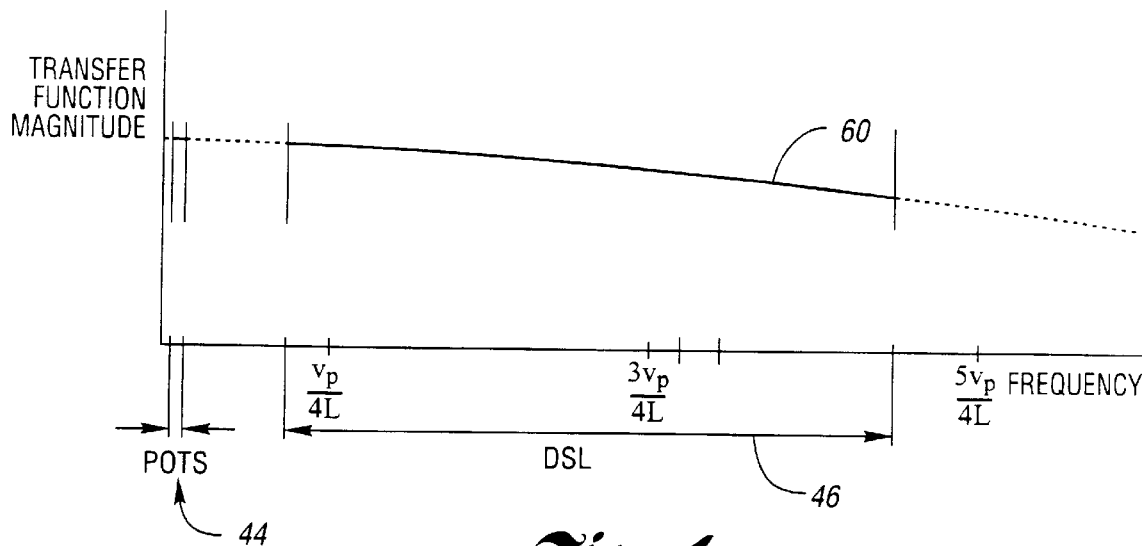
FIG. 4 is a graph of the magnitude of a transfer function for a bridged tap terminated subscriber loop according to an embodiment of the present invention.

Referring now to FIG. 4, a graph of the magnitude of a transfer function for a bridged tap terminated subscriber loop according to an embodiment of the present invention is shown. Curve 60 indicates a desirable magnitude transfer function for subscriber loop 30 with bridged tap 32 and bridged tap terminator 50. Preferably, curve 60 exhibits no local minima 42 over POTS frequency range 44 and DSL frequency range 46. The dashed regions of curve 60 indicate frequency ranges over which no signals are transmitted and, hence, attenuation levels are not critical.

Figure 5:
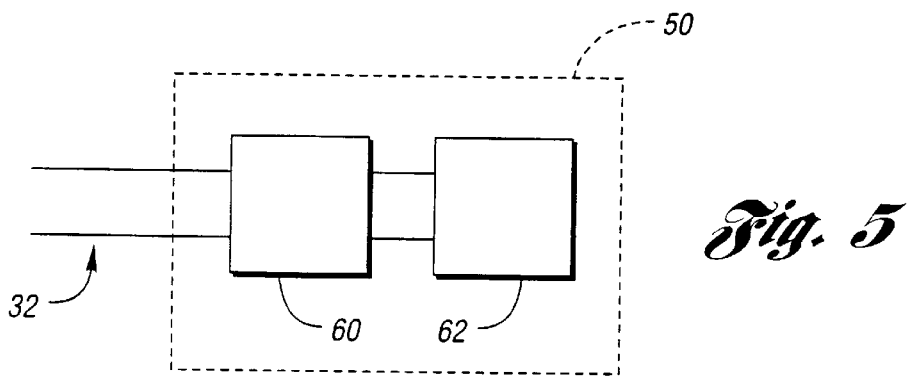
FIG. 5 is a block diagram of a bridged tap terminator having a filter and a matching circuit according to an embodiment of the present invention.

Referring now to FIG. 5, a block diagram of a bridged tap terminator according to an embodiment of the present invention is shown. Bridged tap terminator 50 includes filter 60 connected to bridged tap 32. Filter 60 provides high impedance for POTS signals and low insertion loss for DSL signals. Matching circuit 62 is connected to filter 60. Matching circuit 62 provides impedance matching for DSL signals.

Figure 6:
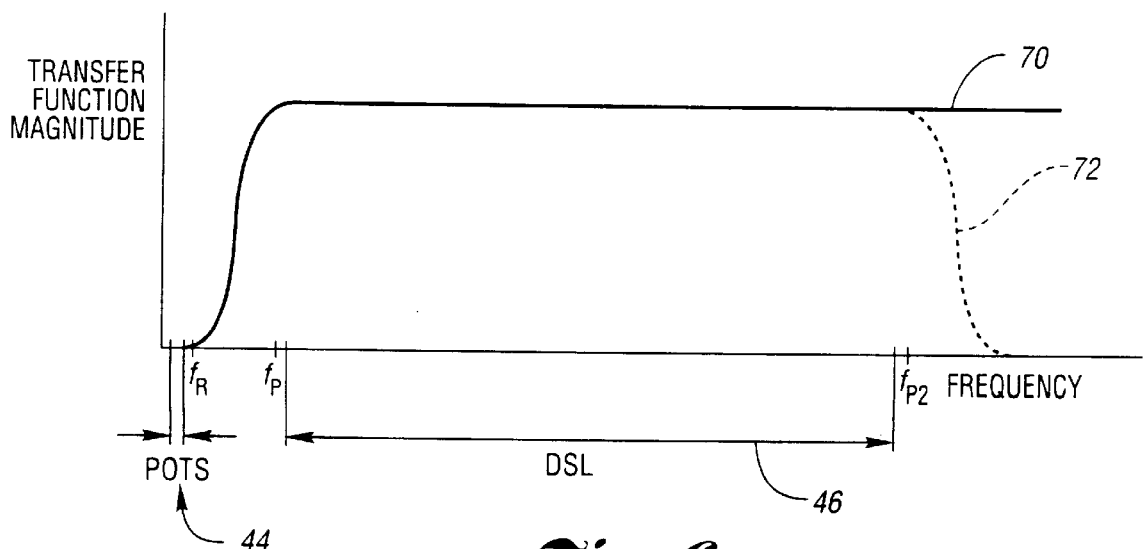
FIG. 6 is a graph of the magnitudes of a transfer functions for filters that may be used in bridged tap terminators according to embodiments of the present invention.

Referring now to FIG. 6, graphs of transfer function magnitudes for the filter in the bridged tap terminator are shown. Filter 60 may be implemented with a high pass filter, as shown by curve 70, or a band pass filter, as shown by curve 72. High pass curve 70 may be defined by the transfer function magnitude at two frequencies. Reject frequency, $f_R$, defines the frequency below which signal frequencies are effectively completely rejected. Pass frequency, $f_P$, is the frequency above which all signal frequencies are effectively passed. For filter 60, reject frequency $f_R$ should be greater than the highest frequency in POTS frequency range 44. Pass frequency $f_P$ should be greater than reject frequency $f_R$ but less than the smallest frequency in DSL frequency range 46.

If filter 60 is implemented with a band pass filter, band pass curve 72 may be designed to follow high pass curve 70 up to DSL frequency range 46. Band pass curve 72 should remain flat to second pass frequency, $f_{P2}$, at which point roll off is allowed. However, flatness in the pass band may be exchanged for steeper roll off. Second pass frequency $f_{P2}$ should be greater than the highest frequency component in DSL frequency range 46.

Figure 7:
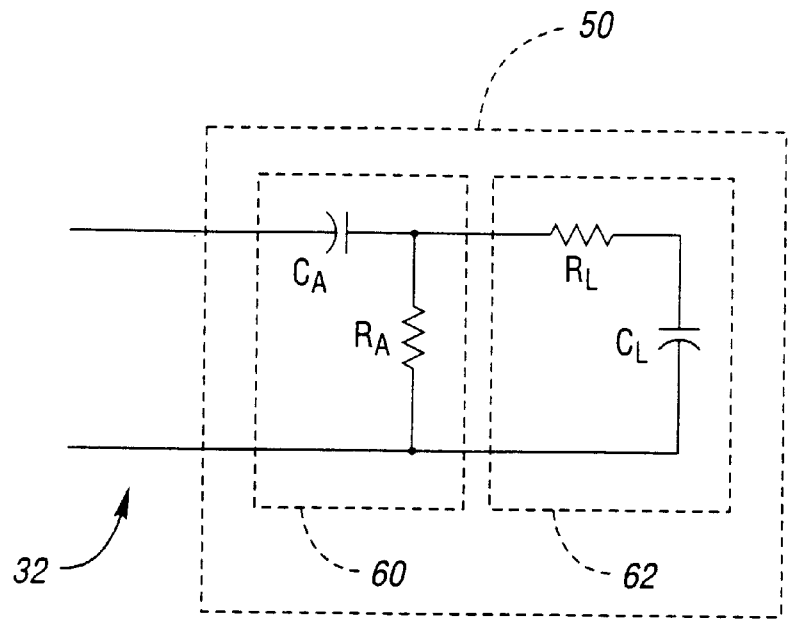
FIG. 7 is a schematic diagram of filter elements implementing an embodiment of a bridged tap terminator.

Referring now to FIG. 7, a schematic diagram of filter elements implementing an embodiment of a bridged tap terminator is shown. Filter 60 is implemented as a first-order high pass filter with resistor $R_A$ and capacitor $C_A$. Matching circuit 62 provides impedance matching using resistor $R_L$ and capacitor $C_L$.

Figure 8:
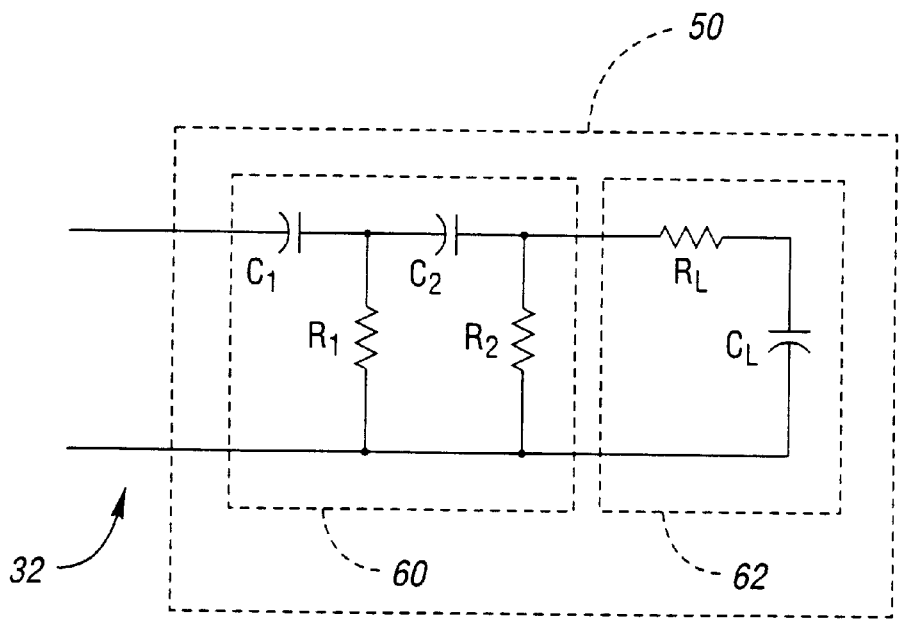
FIG. 8 is a schematic diagram of filter elements implementing an alternative embodiment of a bridged tap terminator.

Referring now to FIG. 8, a schematic diagram of filter elements implementing an alternative embodiment of a bridged tap terminator is shown. Filter 60 is implemented as a second-order high pass filter with capacitors $C_1$ and $C_2$ together with resistors $R_1$ and $R_2$. Matching circuit 62 provides impedance matching through resistor $R_L$ and capacitor $C_L$.

An example of determining coefficient values, namely resistance and capacitance values, will now be provided. For this example, POTS frequency range 44 has an upper frequency of approximately 4 kHz. DSL frequency renge 46 extends between approximately 25 kHz to approximately 1.4 MHz for the example of a rate adaptive DSL employing the CAP line code. DSL frequency renge 46 includes both upstream allocations for transmission from customer premises 26 to central office 22 as well as downstream allocation for transmitting from central office 22 to customer premises 28. The impedance of bridged tap 32 is evaluated as a function of frequency over DSL frequency range 46. Characteristic impedance can be calculated from closed form expressions for twisted pair primary constants such as R, L, C, G, and the like. While the characteristic impedance variation is dependent upon the conductor diameter, it is simpler and less expensive to design a single bridged tap terminator 50 which will accommodate a variety of conductor diameters. For example, bridged tap terminator 50 can be designed to terminate either 24 AWG or 26 AWG wiring. The impedance of bridged tap 32 is complex, containing both a resistive part and a capacitive reactance part. The resistance can vary from roughly 140 ohms on 26 AWG wiring at the low end of DSL frequency renge 46 to approximately 100 ohms on 24 AWG wire at the high end of DSL frequency range 46. Similarly, capacitive reactance can vary from 70 ohms to 6 ohms. Values of 106 ohms and 23 nF were chosen as the resistance and capacitance, respectively, that reflect nominal characteristic impedance values for bridged tap 32 across DSL frequency range 46. Hence, resistance value $R_L$ is set to 106 ohms and capacitor value $C_L$ is set to 23 nF. Coefficients for filter 60 were chosen to provide a second-order high pass filter. The pass frequency $f_P$ was chosen as 25 kHz. Values for $R_1=R_2$ and $C_1=C_2$ were selected such that a minimum of 20 dB rejection within POTS frequency range 44 would result. Two values which meet this criteria are resistance $R_1=R_2=10$ kohms and $C_1=C_2=1$ nF.

Although only first- and second-order RC passive high pass filters have been shown, other filter configurations are possible within the spirit and scope of the present invention. Active filters may be used. However, since no power is required, passive filters are preferred. RL and RLC filters may be substituted for RC filters. Band pass filters may be implemented to remove unwanted high frequency components. Higher order filters may be required if the high end of POTS frequency range 44 is close to the low end of DSL frequency range 46.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A method for improving reception on a subscriber loop used to carry plain old telephone service (POTS) signals and digital subscriber line (DSL) signals between a central office and customer premises, the subscriber loop containing a bridged tap, the method comprising:

determining coefficients for a terminating filter, the filter providing high tap impedance for POTS signals, low insertion loss for DSL signals, and impedance matching for DSL signals;

constructing the terminating filter based on the determined coefficients; and terminating the bridged tap with the constructed filter.

2. A method for improving DSL reception as in claim 1 wherein determining coefficients comprises:

selecting high pass filter coefficients to provide high impedance for POTS signal and low insertion loss for DSL signals; and selecting coefficients to match the bridged tap characteristic impedance.

3. A method for improving DSL reception as in claim 1 wherein determining coefficients comprises:

selecting band pass filter coefficients to provide high impedance for POTS signals and low insertion loss for DSL signals; and selecting coefficients to match the bridged tap characteristic impedance.

4. A bridged tap terminator for improving reception on a subscriber loop used to carry plain old telephone service (POTS) signals and digital subscriber line (DSL) signals between a central office and customer premises, the subscriber loop containing a bridged tap, the bridged tap terminator comprising:

a filter connected to the bridged tap, the filter operative to provide high impedance for POTS signals and low insertion loss for DSL signals; and a matching circuit connected to the filter, the matching circuit operative to provide impedance matching for DSL signals.

5. The bridged tap terminator of claim 4 wherein the filter is a high pass filter.

6. The bridged tap terminator of claim 4 wherein the filter is a band pass filter.

7. A subscriber loop system for carrying plain old telephone service (POTS) signals and digital subscriber line (DSL) signals comprising:

a central office, the central office comprising POTS communication equipment and DSL communication equipment;

at least one customer premises including POTS communication equipment and DSL communication equipment;

a subscriber loop connecting POTS communication equipment in each of the at least one customer premises with corresponding POTS communication equipment in the central office and connecting DSL equipment in each of the at least one customer premises with corresponding DSL equipment in the central office, the subscriber loop including a bridged tap; and a bridged tap terminator connected to the bridged tap, the bridged tap terminator comprising (a) a filter connected to the bridged tap, the filter operative to provide high impedance for POTS signals and low insertion loss for DSL signals, and (b) a matching circuit connected to the filter, the matching circuit operative to provide impedance matching for DSL signals.

8. A subscriber loop system as in claim 7 wherein the filter is a high pass filter.

9. A subscriber loop system as in claim 7 wherein the filter is a band pass filter.

10. A subscriber loop system as in claim 7 wherein the subscriber loop comprises twisted pair cabling.

* * * * *